(12) United States Patent
Takeuchi et al.

(10) Patent No.: US 11,262,373 B2
(45) Date of Patent: Mar. 1, 2022

(54) DETECTION METHOD, DETECTION APPARATUS AND TEST KIT

(71) Applicant: Konica Minolta, Inc., Tokyo (JP)

(72) Inventors: Mami Takeuchi, Hino (JP); Masataka Matsuo, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 636 days.

(21) Appl. No.: 15/776,297

(22) PCT Filed: Oct. 28, 2016

(86) PCT No.: PCT/JP2016/082044
§ 371 (c)(1),
(2) Date: May 15, 2018

(87) PCT Pub. No.: WO2017/086128
PCT Pub. Date: May 26, 2017

(65) Prior Publication Data
US 2018/0321269 A1 Nov. 8, 2018

(30) Foreign Application Priority Data
Nov. 16, 2015 (JP) .............................. JP2015-224213

(51) Int. Cl.
*G01N 35/08* (2006.01)
*G01N 21/64* (2006.01)
*G01N 37/00* (2006.01)

(52) U.S. Cl.
CPC ............. *G01N 35/08* (2013.01); *G01N 21/64* (2013.01); *G01N 21/6428* (2013.01); *G01N 37/00* (2013.01); *G01N 2021/6439* (2013.01)

(58) Field of Classification Search
None
See application file for complete search history.

(56) References Cited

U.S. PATENT DOCUMENTS

| 2006/0044563 A1* | 3/2006 | Fujikura | ........... B01L 3/502715 356/445 |
| 2008/0210691 A1 | 9/2008 | Yoshinari et al. | |
| 2013/0312546 A1* | 11/2013 | Wada | ............... G01N 33/48707 73/864.11 |

FOREIGN PATENT DOCUMENTS

| EP | 0836884 A2 | 4/1998 |
| EP | 1203959 A1 | 5/2002 |

(Continued)

OTHER PUBLICATIONS

Extended European Search Report corresponding to Application No. 16866130.4-1020 PCT/JP2016082044; dated Aug. 28, 2018.

(Continued)

*Primary Examiner* — Rebecca M Giere
(74) *Attorney, Agent, or Firm* — Cantor Colburn LLP

(57) ABSTRACT

Supplying a liquid to a detection chip including a housing having an opening portion and internally housing the liquid and including an elastic sheet covering the opening portion and having a penetrating portion providing communicating between the inside and the outside of the housing, specifically by inserting a liquid delivery nozzle to the housing via the penetrating portion and supplying the liquid into the housing in a state where the nozzle is in contact with the elastic sheet so as to close the penetrating portion. The penetrating portion is one of a hole and a notch. One of the maximum length of the opening of the hole and the maximum length of the notch is smaller than the outer diameter of the nozzle at a portion coming in contact with the elastic sheet when the nozzle is inserted to close the penetrating portion when a liquid is supplied into the housing.

18 Claims, 7 Drawing Sheets

(56) References Cited

FOREIGN PATENT DOCUMENTS

| EP | 2672273 A1 | 12/2013 |
|---|---|---|
| JP | H10132713 A | 5/1998 |
| JP | 2004184156 A | 7/2004 |
| JP | 2007263705 A | 10/2007 |
| JP | 2009156682 A | 7/2009 |
| JP | 2012159358 A | 8/2012 |
| WO | 2005097323 A1 | 10/2005 |

OTHER PUBLICATIONS

JPO Notice of Reasons for Refusal for corresponding Patent Application No. JP2017-551804; dated Mar. 10, 2020.
European Office Action for corresponding EP Application No. 16866130.4, dated Jun. 30, 2020.
JPO Decision of Refusal for corresponding to JP Application No. 2017-551804, dated Jul. 7, 2020.
International Search Report corresponding to Application No. PCT/JP2016/082044; dated Dec. 13, 2016.
Written Opinion of the International Searching Authority corresponding to Application No. PCT/JP2016/082044; dated Dec. 13, 2016.

* cited by examiner

DETECTION METHOD, DETECTION APPARATUS AND TEST KIT

CROSS REFERENCE TO RELATED APPLICATIONS

This is a U.S. national stage of application No. PCT/JP2016/082044, filed on Oct. 28, 2016. Priority under 35 U.S.C. § 119(a) and 35 U.S.C. § 365(b) is claimed from Japanese Patent Application No. 2015-224213 filed on Nov. 16, 2015, the disclosure of which is also incorporated herein by reference.

TECHNICAL FIELD

The present invention relates to a detection method and a detection apparatus for detecting the presence or amount of a detection target substance, and a test kit used for detecting the presence or amount of the detection target substance.

BACKGROUND ART

With capability in a clinical test or the like to detect a trace amount of a detection target substance such as protein or DNA quantitatively with high sensitivity, it is possible to rapidly grasp conditions of a patient in treatment. Therefore, detection apparatuses for detecting a trace amount of a detection target substance quantitatively with high sensitivity have been developed (refer to Patent Literature 1, for example).

The detection apparatus described in Patent Literature 1 uses a detection chip including: a chip main body including a flow path (housing) housing a specimen and an opening that provides communication between the inside and the outside of the flow path; and an elastic member (elastic sheet) covering the opening. The elastic sheet has a three-layer structure including a first sheet, a second sheet, and a first sheet stacked in this order. The first sheet is a polymer sheet (film) having high ductility and low elasticity. The second sheet is an aluminum sheet having lower ductility than the first sheet. In the detection apparatus described in Patent Literature 1, a nozzle member (hereinafter also simply referred to as "nozzle") for injecting a liquid into a flow path and sucking a liquid from a flow path is pressed against an elastic sheet to break the sheet. This forms an opening portion in the elastic sheet, and enables the elastic sheet to be brought into close contact with an outer peripheral surface of the nozzle. With this operation, the detection apparatus described in Patent Literature 1 is capable of preventing liquid leakage from the opening portion (penetrating portion formed by the sheet breakage) that can be generated by the pressure variation in the flow path. Moreover, since the nozzle and the elastic sheet are in close contact with each other in this detection apparatus, it is possible to maintain the pressure in the flow path generated at the time of liquid delivery, leading to appropriate delivery of the liquid.

CITATION LIST

Patent Literature

Patent Literature 1: JP 2012-159358 A

SUMMARY OF INVENTION

Technical Problem

Unfortunately, however, the detection apparatus described in Patent Literature 1 needs to press the nozzle against the elastic sheet to cause breakage, leading to a great amount load applied to the nozzle and the detection apparatus at the time of breakage. Therefore, the nozzle and the detection apparatus need to have sufficient rigidity to withstand the load during breakage. Moreover, due to ductility of the elastic sheet, the elastic sheet stretches by a predetermined distance without being broken immediately even when the nozzle is pressed against the elastic sheet. For this reason, the detection apparatus described in Patent Literature 1 needs to ensure a space in the housing, allowing the elastic sheet to stretch for breakage. Therefore, the detection chip described in Patent Literature 1 has room for improvement from the viewpoint of miniaturization.

A first object of the present invention is to provide a detection method and a detection apparatus capable of allowing the liquid delivery nozzle to come in contact with the elastic sheet on which a penetrating portion is provided so as to close the penetrating portion to appropriately perform liquid delivery, without breaking the elastic sheet of the detection chip. A second object of the present invention is to provide a test kit capable of allowing the liquid delivery nozzle to come in contact with the elastic sheet so as to close the penetrating portion without breaking the elastic sheet of the detection chip.

Solution to Problem

In order to solve the above problems, a detection method according to an embodiment of the present invention is a detection method for detecting the presence or amount of a detection target substance in a specimen, the method including: a step of supplying a liquid to a detection chip including a housing having an opening portion and internally housing a liquid and including an elastic sheet covering the opening portion and having a penetrating portion providing communicating between the inside and the outside of the housing, specifically by inserting a liquid delivery nozzle to the housing via the penetrating portion and supplying the liquid into the housing in a state where the nozzle is in contact with the elastic sheet so as to close the penetrating portion, in which the penetrating portion is one of a hole and a notch, and one of a maximum length of the opening of the hole and a maximum length of the notch is smaller than an outer diameter of the nozzle at a portion coming in contact with the elastic sheet when the nozzle is inserted so as to close the penetrating portion when the liquid is supplied into the housing.

In order to solve the above problems, a detection apparatus according to an embodiment of the present invention is a detection apparatus for detecting the presence or amount of a detection target substance in a specimen, the detection apparatus including: a chip holder that holds a detection chip including a housing having an opening portion and internally housing a liquid and including an elastic sheet covering the opening portion and providing communication between the inside and the outside of the housing; and a liquid delivery section including a pump to which a liquid delivery nozzle is attached and delivering a liquid into the housing of the detection chip held by the chip holder, in which the liquid delivery section inserts the nozzle to the housing via the penetrating portion and supplies a liquid into the housing in a state where the nozzle is in contact with the elastic sheet so as to close the penetrating portion, and the penetrating portion is one of a hole and a notch, and one of a maximum length of the opening of the hole and a maximum length of the notch is smaller than an outer diameter of the nozzle at a portion coming in contact with the elastic sheet when the nozzle is inserted so as to close the penetrating portion when the liquid delivery section supplies the liquid into the housing.

In order to solve the above problems, a test kit according to an embodiment of the present invention includes: a detection chip including a housing having an opening portion and internally housing a liquid, and including an elastic sheet covering the opening portion and having a penetrating portion providing communication between the inside and the outside of the housing; and a liquid delivery nozzle to be inserted into the housing via the penetrating portion and supplying a liquid to the housing, in which the penetrating portion is one of a hole or a notch, and one of a maximum length of the opening of the hole and a maximum length of the notch is smaller than an outer diameter of the nozzle at a position from an end of the nozzle in a longitudinal direction of the nozzle, corresponding to a depth from a bottom surface of the housing to the elastic sheet.

Advantageous Effects of Invention

According to the present invention, liquid delivery can be appropriately performed, making it possible to detect a detection target substance with high accuracy. Moreover, since there is no need to break the elastic sheet, it is possible to lower the rigidity level needed for the liquid delivery nozzle and the detection apparatus, and to miniaturize the detection chip.

DESCRIPTION OF EMBODIMENTS

Hereinafter, an embodiment of the present invention will be described in detail with reference to the drawings. The following description uses, as a representative example of a detection apparatus, an apparatus utilizing surface plasmon resonance fluorescence analysis method (surface plasmon-field enhanced fluorescence spectroscopy: hereinafter, abbreviated as "SPFS"). The apparatus will be also referred to as an "SPFS apparatus".

Figure 1:
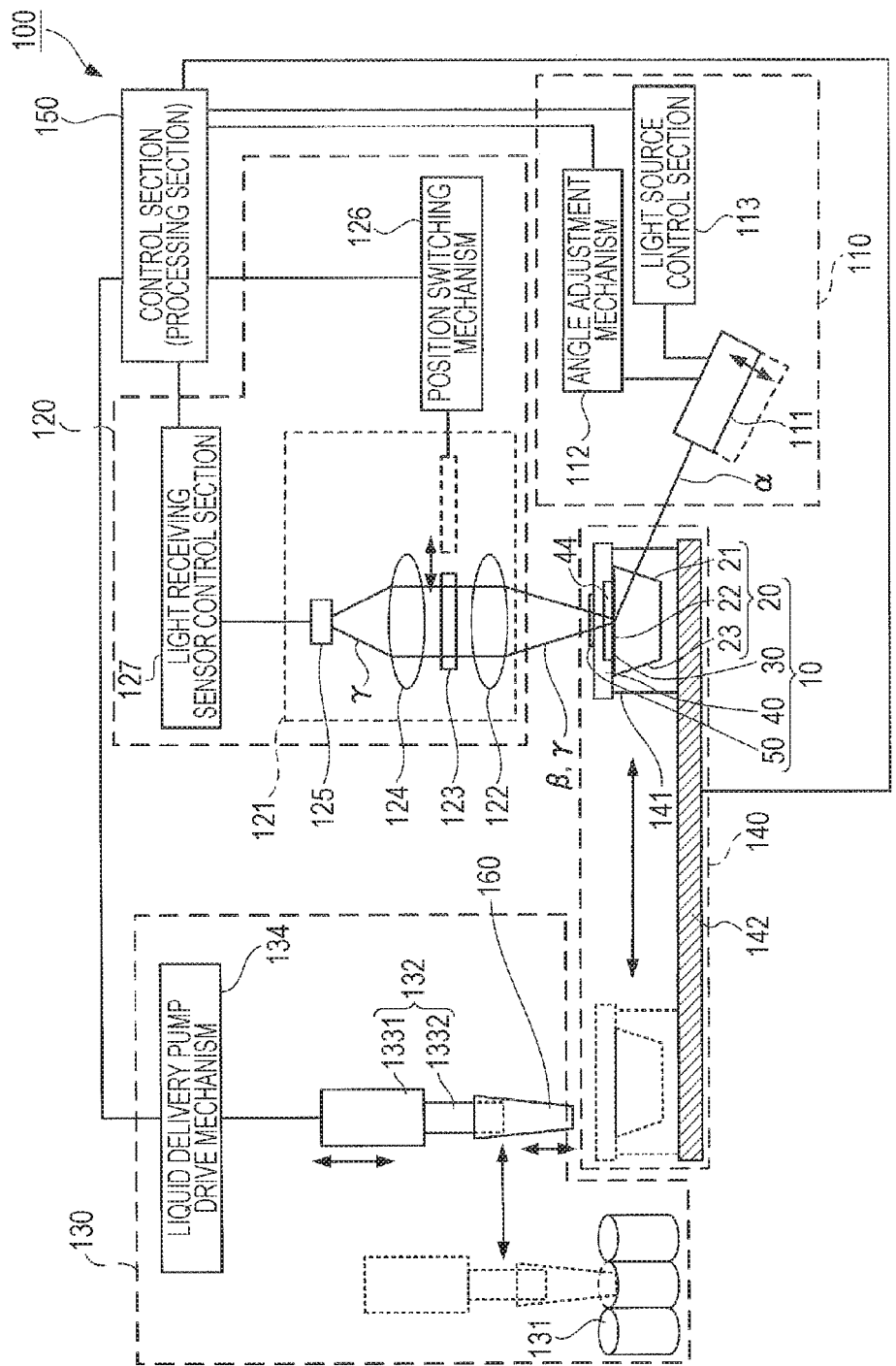
FIG. 1 is a diagram illustrating a configuration of a surface plasmon-field enhanced fluorescence detection apparatus according to an embodiment of the present invention.

FIG. 1 is a diagram illustrating a configuration of an SPFS apparatus 100 according to an embodiment of the present invention. As illustrated in FIG. 1, the SPFS apparatus 100 includes a light emission unit (light emission section) 110 for emitting light onto a detection chip 10, a light receiving unit (light detector) 120 for detecting fluorescence γ emitted from the detection chip 10, a liquid delivery unit (liquid delivery section) 130 for delivering liquids, a conveyance unit 140 for conveying the detection chip 10, and a control section (processing section) 150 to control these components. The SPFS apparatus 100 is used in a state where the detection chip 10 is attached to a chip holder 141 of the conveyance unit 140. Accordingly, the detection chip 10 will be described first, and individual components of the SPFS apparatus 100 will be described thereafter.

(Configuration of Detection Chip)

Figure 2A:
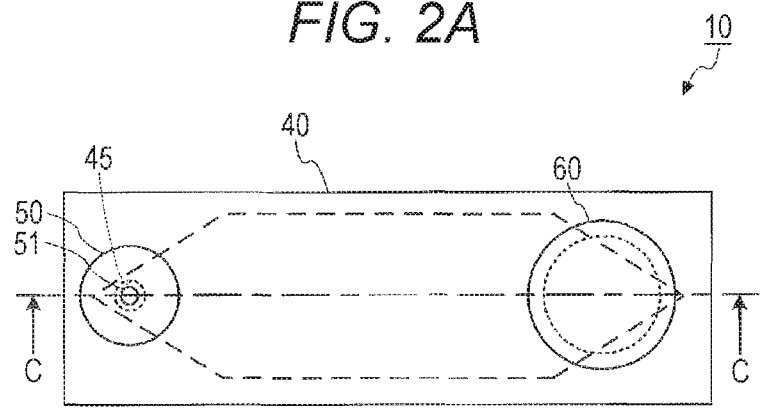
FIG. 2A to FIG. 2C are diagrams illustrating a configuration of a detection chip according to an embodiment of the present invention.
Figure 2B:
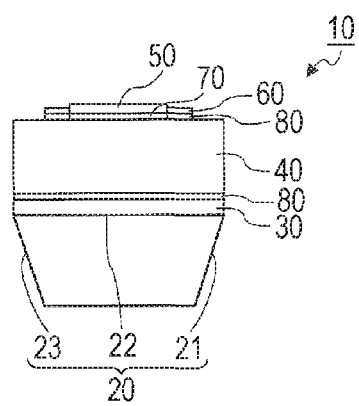
Figure 2C:
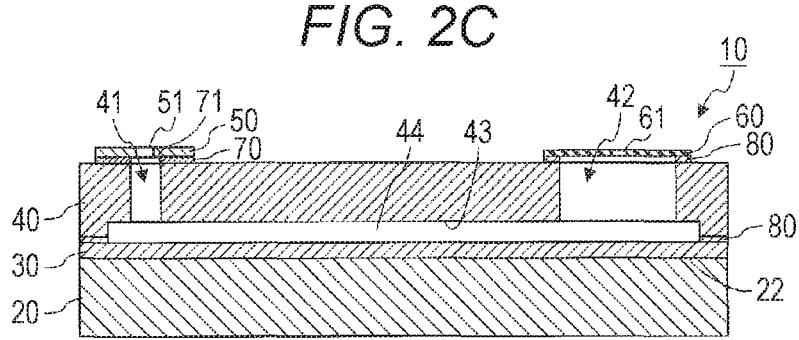

FIG. 2A to FIG. 2C are diagrams illustrating a configuration of the detection chip 10 according to the present embodiment. FIG. 2A is a plan view of the detection chip 10, FIG. 2B is a left side view of the detection chip 10, and FIG. 2C is a cross-sectional view taken along line C-C in FIG. 2A.

The detection chip 10 includes: a prism 20 having an incident surface 21, a film forming surface 22, and an emission surface 23; a metal film 30 formed on the film forming surface 22; a flow path lid 40 arranged on the metal film 30 and including a first through hole 41, a stirring through hole 42 and a flow path groove 43; and an elastic sheet 50 arranged on the flow path lid 40. The detection chip 10 may include or omit a sheet covering the stirring through hole 42. The detection chip 10 according to the present embodiment further includes a sheet 60 arranged on the flow path lid 40. With the flow path lid 40 arranged on the metal film 30, a housing having an opening portion and configured to internally house the liquid is formed. In the present embodiment, the flow path groove 43 formed in the flow path lid 40 is closed by the metal film 30, so as to form a flow path 44 through which the liquid flows. At the same time, the first through hole 41 formed in the flow path lid 40 and one opening of the stirring through hole 42 are closed by the metal film 30. The other opening of the first through hole 41 is an opening portion 45 that provides communication between the inside and the outside of the flow path 44. The elastic sheet 50 covers the other opening of the first through hole 41, while the sheet 60 covers the other opening of the stirring through hole 42. In the present embodiment, the housing includes the flow path 44 and the first through hole 41 and the stirring through hole 42, in which one opening is closed by the metal film 30. In this description, the term "sheet" is used as a term including a film.

The prism 20 is formed of a dielectric transparent to the excitation light α. As described above, the prism 20 includes the incident surface 21, the film forming surface 22, and the emission surface 23.

The incident surface 21 allows the excitation light α from the light emission unit 110 to be incident on the inside of the prism 20. The metal film 30 is arranged on the film forming surface 22. The excitation light α incident on the inside of the prism 20 is reflected by the metal film 30. More specifically, the excitation light α is reflected at an interface (film forming surface 22) between the prism 20 and the metal film 30. The emission surface 23 emits the excitation light α reflected by the metal film 30 to the outside of the prism 20.

The shape of the prism 20 is not particularly limited. As illustrated in FIG. 2B and FIG. 2C, the shape of the prism 20 in the present embodiment is a columnar body having a trapezoid as a bottom surface. The surface corresponding to one bottom side of the trapezoid is the film forming surface 22, the surface corresponding to one leg is the incident surface 21, and the surface corresponding to the other leg is the emission surface 23. The incident surface 21 is formed to suppress the return of the excitation light α to the light emission unit 110. In a case where the light source of the excitation light α is a laser diode (hereinafter also referred to as "LD"), the return of the excitation light α to the LD would disturb the excited state of the LD to induce variation in the wavelength and the output of the excitation light α. Therefore, in a scanning range about the ideal resonance angle or enhancement angle as a center, the angle of the incident surface 21 is set to suppress incidence of the excitation light α to the incident surface 21 perpendicularly.

Note that the "resonance angle" means an incidence angle when the light amount of the reflected light (not illustrated) emitted from the emission surface 23 is minimized in a case where the incident angle of the excitation light α with respect to the metal film 30 is scanned. In addition, the "enhancement angle" is an incident angle when the light amount of scattering light β (hereinafter referred to as "plasmon scattered light") having a same wavelength as the excitation light α emitted above the detection chip 10 is maximized when the incident angle of the excitation light α with respect to the metal film 30 is scanned. For example, the angle between the incident surface 21 and the film forming surface 22 and the angle between the film forming surface 22 and the emission surface 23 are both about 80°.

Examples of materials for the prism 20 include resin and glass. Examples of the resin to form the prism 20 include polymethylmethacrylate (PMMA), polycarbonate (PC), and cycloolefin-based polymer. The prism 20 is preferably a resin having a refractive index of 1.4 to 1.6 and a small birefringence.

The metal film 30 is formed on one surface (film forming surface 22) of the prism 20 and in the flow path 44. With the presence of the metal film 30, interaction (surface plasmon resonance; SPR) occurs between the photons of the excitation light α incident on the film forming surface 22 under the total reflection condition and the free electrons in the metal film 30, making it possible to generate localized field light on the surface of the metal film 30. The material of the metal film 30 is not particularly limited as long as it is a metal that generates surface plasmon resonance. Examples of the material of the metal film 30 include gold, silver, copper, aluminum, and alloys of these. In the present embodiment, the metal film 30 is a gold thin film. The thickness of the metal film 30 is not particularly limited. Still, the thickness is preferably in the range of 30 nm to 70 nm.

Moreover, a capture agent (not illustrated) for capturing the detection target substance is immobilized on a surface of the metal film 30 not facing the prism 20. More specifically, the capture agent is directly or indirectly immobilized on the surface of the metal film 30. The detection target substance can be selectively detected by the capture agent. At least a portion of the surface of the metal film 30 on which the capture agent is immobilized is set as a reaction field on which reactions such as binding of the capture agent to the detection target substance (primary reaction) or fluorescence labeling (secondary reaction) of the detection target substance. The type of the capture agent is not particularly limited as long as it can capture a detection target substance. For example, the capture agent is a whole or fragment of an antibody capable of specifically binding to the detection target substance.

The flow path lid 40 is arranged on the surface of the metal film 30 not facing the prism 20 with the flow path 44 interposed between. When the metal film 30 is not formed on the entire surface of the prism 20, the flow path lid 40 may be arranged on the film forming surface 22 with the flow path 44 interposed therebetween. As described above, the flow path groove 43 is formed on the back surface of the flow path lid 40. With the flow path lid 40 arranged on the metal film 30, the flow path 44 that allows liquids such as a specimen, a fluorescent labeling liquid, and a washing liquid to flow is formed. The reaction field is exposed in the flow path 44. When liquids are injected into the flow path 44, the liquids come in contact with the capture agent of the reaction field in the flow path 44.

The flow path lid 40 is a resin member formed of a material transparent to the light (plasmon scattered light β and fluorescence γ) emitted from the reaction field of the metal film 30. The material of the flow path lid 40 is not particularly limited as long as it is transparent to the light. A portion of the flow path lid 40 may be formed of an opaque material as long as it is capable of guiding the light to the light receiving unit 120. The flow path lid 40 is joined to the metal film 30 or the prism 20 by bonding with a double-faced tape or an adhesive, laser welding, ultrasonic welding, crimping using a clamp member, or the like.

The type of liquid flowing through the flow path 44 is not particularly limited. Exemplary types of the liquid include a specimen containing a detection target substance, a fluorescent labeling liquid containing a fluorescent substance, and a buffer solution. The types of the specimen and the detection target substance are not particularly limited. Examples of specimens include body fluids such as blood, serum, plasma, urine, nostrils, saliva, and semen, and diluents of these. Examples of the detection target substance include nucleic acids (DNA, RNA, or the like), proteins (polypeptides, oligopeptides, or the like), amino acids, carbohydrates, lipids and modified molecules of these.

The first through hole 41 of the flow path lid 40 includes the opening portion 45. The opening portion 45 provides communication between the inside and the outside of the flow path 44 via the penetrating portion 51 of the elastic sheet 50 described below.

The elastic sheet 50 is a sheet-shaped member having ductility and elasticity and configured to cover the opening portion 45 and including a penetrating portion 51 that provides communication between the inside and the outside of the flow path 44. In a case where the elastic sheet 50 has no ductility and a tear strength is small, the elastic sheet 50 would tear when the nozzle 160 (described below) is inserted to close the penetrating portion 51, making it difficult to maintain the pressure inside the flow path 44. The elastic sheet 50 is arranged on the flow path lid 40 so as to cover the opening portion 45 of the flow path lid 40. At this time, the penetrating portion 51 is arranged at a position corresponding to the opening portion 45 of the flow path lid 40.

Figure 3A:
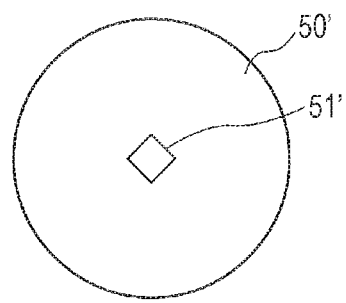
FIG. 3A and FIG. 3B are plan views illustrating a configuration of an elastic sheet in a detection chip according to a modification of an embodiment of the present invention.
Figure 3B:
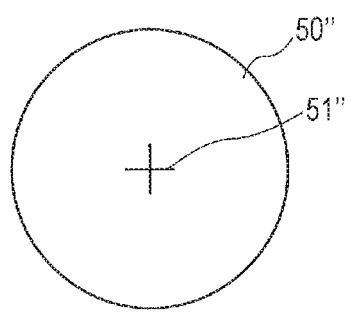

The penetrating portion 51 is configured to provide communication between the inside and the outside of the flow path 44. When the nozzle 160 is inserted to the flow path 44 via the penetrating portion 51 until the end of the nozzle 160 comes at a height (hereinafter, referred to as a liquid delivery height) at which the liquid delivery is performed in supplying the liquid into the flow path 44, the nozzle 160 touches (comes into contact with) the elastic sheet 50 so as to close the penetrating portion 51. The contact of the nozzle 160 with the elastic sheet 50 so as to close the penetrating portion 51 makes it possible to seal the inside of the flow path 44 on the side of the first through hole 41 at liquid delivery. The shape and size of the penetrating portion 51 is not particularly limited as long as it can achieve the above-described function, and can be appropriately designed in accordance with the shape and size of the nozzle 160. The shape of the penetrating portion 51 is a hole and a notch. The shape of the hole and notch is not particularly limited as long as it can achieve the above-described function. In the present embodiment, as illustrated in FIG. 2A, the penetrating portion 51 is a circular hole. FIG. 3A and FIG. 3B are plan views illustrating configurations of elastic sheets 50' and 50" in a detection chip according to a modification of the present embodiment. As illustrated in FIG. 3A, a penetrating portion 51' of the elastic sheet 50' is a rectangular hole. Moreover, as illustrated in FIG. 3B, the penetrating portion 51" of the elastic sheet 50" is a cross-shaped notch.

From the viewpoint of enhancing the adhesion between the nozzle 160 and the elastic sheet 50, the maximum length of the opening of the hole or the maximum length of the notch is smaller than an outer diameter of the nozzle 160 at a portion to come in contact with the elastic sheet 50 when the nozzle 160 is inserted into the flow path 44 via the penetrating portion 51 until the end of the nozzle 160 is positioned at the liquid delivery height. In other words, the maximum length of the opening of the hole or the maximum length of the notch is smaller than the outer diameter of the nozzle 160 at a position from the end of the nozzle 160 in a longitudinal direction of the nozzle 160 corresponding to a depth from the bottom surface of the flow path 44 to the elastic sheet 50 Moreover, the maximum length of the opening of the hole or the maximum length of the notch is more preferably ½ or below of the outer diameter of the nozzle 160 at a portion coming in contact with the elastic sheet 50 when the nozzle 160 is inserted into the flow path 44 so as to close the penetrating portion 51, that is, when the nozzle 160 is inserted into the flow path 44 via the penetrating portion 51 until the end of the nozzle 160 is positioned at the liquid delivery height. Moreover, the maximum length of the opening of the hole, the minimum length of the opening of the hole, the maximum length of the notch, and the minimum length of the notch are not particularly limited, and can be set appropriately in accordance with the size of the nozzle 160. The maximum length of the opening of the hole and the maximum length of the notch are each 1.5 mm, for example. Moreover, the minimum length of the opening of the hole and the minimum length of the notch are each 0.1 mm, for example.

The material of the elastic sheet 50 is not particularly limited as long as it has elasticity to the extent that the nozzle 160 can be brought into contact with the elastic sheet 50 so as to close the penetrating portion 51. Examples of the material of the elastic sheet 50 include low density polyethylene (LDPE), linear low density polyethylene (LLDPE), medium density polyethylene (MDPE), nylon, non-stretched polypropylene (CPP), ethylene-vinyl alcohol copolymer (EVOH), silicone, polyurethane, polyvinyl alcohol (PVA) and polyvinyl chloride (PVC). From the viewpoint of enhancing the adhesion between the nozzle 160 and the elastic sheet 50, the tensile elastic constant of the elastic sheet 50 is preferably 0.05 GPa to 2 GPa. In addition, the tensile elongation at break of the elastic sheet 50 (for the measuring method, refer to Example 3 described below) is preferably 200% to 2000%. In addition, the tear strength of the elastic sheet 50 (for the measuring method, refer to Example 4 to be described below) is preferably 80 mN to 3000 mN. The thickness of the elastic sheet 50 is not particularly limited as long as desired elasticity is achieved, and can be appropriately set in accordance with the material of the elastic sheet 50. For example, the thickness of the elastic sheet 50 is 10 µm to 500 µm. The outer shape and size of the elastic sheet 50 is not particularly limited as long as the penetrating portion 51 can achieve the above-described function and does not hinder the optical path of light such as excitation light α and fluorescence γ.

The sheet 60 covers the opening of the stirring through hole 42. An air hole 61 is formed in the sheet 60. This allows the liquid swept into the flow path 44 from the liquid delivery nozzle 160 to flow through the flow path 44. The material of the sheet 60 is not particularly limited. Examples of the material of the sheet 60 include polypropylene (PP), ethylene-vinyl alcohol copolymer (EVOH), silicone, polyethylene (PE), polyethylene terephthalate (PET), polyvinyl chloride (PVC), and polyvinyl alcohol (PVA).

It is preferable that the elastic sheet 50 be joined to the periphery of the opening portion 45 via the adhesive sheet 70. This makes it possible to fix the elastic sheet 50 onto the flow path lid 40 more firmly. It is preferable that the adhesive sheet 70 has a second through hole 71 at a position corresponding to the penetrating portion 51. At this time, the minimum length of the opening of the second through hole 71 is preferably greater than the outer diameter of the nozzle 160 at a portion corresponding to the second through hole 71 when the nozzle 160 is inserted into the flow path 44 so as to close the penetrating portion 51 when a liquid is supplied into the flow path 44, that is, when the nozzle 160 is inserted so as to close the penetrating portion 51 until the end of the nozzle 160 is positioned at the liquid delivery height. This makes it possible to fix the elastic sheet 50 more firmly onto the flow path lid 40 in the vicinity of the penetrating portion 51 without causing the nozzle 160 to be in contact with the adhesive sheet 70. Moreover, from the viewpoint of firmly fixing the elastic sheet 50 on the flow path lid 40, it is preferable that the adhesive sheet 70 be arranged so as to surround the opening portion 45, and has a width of at least 1 mm in a direction away from the opening portion 45.

The resonance angle (and the enhancement angle in the immediate vicinity thereof) is roughly determined by the design of the detection chip 10. The design elements are a refractive index of the prism 20, a refractive index of the metal film 30, a thickness of the metal film 30, the extinction coefficient of the metal film 30, the wavelength of the excitation light α, or the like. While the resonance angle and the enhancement angle are shifted by the detection target substance captured on the metal film 30, the amount is below several degrees.

As illustrated in FIG. 1, the excitation light α guided to the prism 20 is incident on the incident surface 21 into the prism 20. The excitation light α incident into the prism 20 is incident and reflected on an interface (film forming surface 22) between the prism 20 and the metal film 30 at a total reflection angle (angle that generates surface plasmon resonance). Reflected light from the interface is emitted to the outside of the prism 20 at the emission surface 23 (not illustrated). Moreover, incidence of the excitation light α onto the interface at an angle that generates surface plasmon resonance causes plasmon scattered light β and fluorescence γ to be emitted in a direction toward the light receiving unit 120 from the reaction field.

(Method for Manufacturing Detection Chip)

Next, an example of a manufacturing method of the detection chip 10 according to the present embodiment will be described. The method of manufacturing the detection chip 10 is not limited to this example.

The detection chip 10 according to the present embodiment can be manufactured by performing steps of: 1) preparing each of the prism 20, the flow path lid 40, the elastic sheet 50 and the sheet 60; 2) forming the metal film 30 and the reaction field on the prism 20; and 3) fixing the prism 20 on which the metal film 30 and the reaction field is formed, the flow path lid 40, the elastic sheet 50, and the sheet 60 in this order. Individual steps will be described below.

First, each of the prism 20, the flow path lid 40, the elastic sheet 50, and the sheet 60 is prepared. For example, the prism 20 and the flow path lid 40 may be prepared by molding a resin into desired shapes by an injection molding method, or may use ready-made products. Moreover, for example, the elastic sheet 50 and the sheet 60 may use ready-made products cut into a desired shape.

Next, the metal film 30 and the reaction field are sequentially formed on the prism 20. The metal film 30 may be formed on a portion or the entire surface of the film forming surface 22 of the prism 20. The method of forming the metal film 30 is not particularly limited, and may be appropriately selected from known methods. Examples of the method of forming the metal film 30 include sputtering, vapor deposition and plating. Next, the capture agent may be immobilized directly or indirectly on the metal film 30. With this procedure, the reaction field can be formed on the prism 20.

The immobilization method of the capture agent is not particularly limited. For example, a self-assembled monolayer (hereinafter referred to as "SAM") or a polymer film in which a capture agent is bound may be formed on the metal film 30. Examples of SAM include membranes formed with substituted aliphatic thiols such as HOOC—$(CH_2)_{11}$—SH. Examples of materials constituting the polymer membrane include polyethylene glycol and MPC polymers. Alternatively, a polymer having a reactive group (or a functional group convertible to a reactive group) capable of binding to the capture agent may be immobilized on the metal film 30, and then the capture agent may be bound to the polymer.

Next, the prism 20, the flow path lid 40, and the elastic sheet 50 are fixed in this order, and then, the sheet 60 is fixed on the flow path lid 40 so as to close the opening of the stirring through hole 42 of the flow path lid 40. The method of fixing the flow path lid 40 on the prism 20 and the method of fixing the elastic sheet 50 and the sheet 60 on the flow path lid 40 are not particularly limited and can be appropriately selected from known methods. For example, a method of fixing the prism 20 and the flow path lid 40, and a method of fixing the flow path lid 40 with the elastic sheet 50 and the sheet 60 includes bonding with a double-faced tape or an adhesive, laser welding, and ultrasonic welding. In the present embodiment, the flow path lid 40 and the elastic sheet 50 are fixed by the adhesive sheet 70. Moreover, the prism 20 (metal film 30) and the flow path lid 40, and the flow path lid 40 and the sheet 60 are adhered by a double-faced tape 80.

(Configuration of SPFS Apparatus)

Next, each of components of the SPFS apparatus 100 will be described. As illustrated in FIG. 1, the SPFS apparatus 100 includes the light emission unit (light emission section) 110, the light receiving unit (light detector) 120, the liquid delivery unit (liquid delivery section) 130, the conveyance unit 140, and the control section (processing section) 150.

The light emission unit 110 emits the excitation light α (single mode laser light) toward the incident surface 21 of the prism 20 of the detection chip 10 held by the chip holder 141. More specifically, a light source unit 111 emits the excitation light α to a region corresponding to the reaction field on the back surface of the metal film 30 at a total reflection angle.

The light emission unit (light emission section) 110 includes the light source unit 111 that emits the excitation light α, an angle adjustment section 112 that adjusts the incident angle of the excitation light α with respect to the interface (film forming surface 22) between the prism 20 and the metal film 30, and a light source control section 113 that controls various devices included in the light source unit 111.

The light source unit 111 emits the excitation light α. For example, the light source unit 111 includes a light source of the excitation light α, a beam shaping optical system, an APC mechanism, and a temperature adjustment mechanism (none of which being illustrated).

The type of the light source is not particularly limited. Examples of types of light sources include laser diodes (LD), light emitting diodes, mercury lamps, and other laser light sources. The wavelength of the excitation light α emitted from the light source is in the range of 400 nm to 1000 nm, for example.

When the excitation light α emitted from the light source is not a beam, the excitation light α emitted from the light source is converted into a beam by a lens, a mirror, a slit, or the like. Moreover, in a case where the excitation light α emitted from the light source is not monochromatic light, the excitation light α emitted from the light source is converted into monochromatic light by a diffraction grating, or the like. Further, when the excitation light α emitted from the light source is not linearly polarized light, the excitation light α emitted from the light source is converted into linearly polarized light by a polarizer, or the like.

The beam shaping optical system includes, for example, a collimator, a band pass filter, a linear polarization filter, a half wave plate, a slit, a zooming means, or the like. The beam shaping optical system may include all or portion of them.

The collimator collimates the excitation light α emitted from the light source.

The band pass filter filters the excitation light α emitted from the light source to obtain narrow band light having a center wavelength alone. This is because the excitation light α from the light source has a slight wavelength distribution width.

The linear polarization filter filters the excitation light α emitted from the light source to obtain completely linearly polarized light. The half wave plate adjusts the polarization direction of the excitation light α so as to allow the P wave component to be incident on the metal film 30. The slit and the zooming means adjust the beam diameter, contour shape, or the like, of the excitation light α.

The APC mechanism controls the light source so as to obtain a constant output of the light source. More specifically, the APC mechanism detects the light amount of light branched from the excitation light α using a photodiode (not illustrated) or the like. Then, the APC mechanism controls the input energy by a regression circuit to control the output of the light source to be constant.

The temperature adjustment mechanism is, for example, a heater or a Peltier element. The wavelength and the energy of the light emitted from the light source might vary depending on the temperature, in some cases. For this reason, the temperature of the light source is maintained at a constant level by the temperature adjustment mechanism so as to control the wavelength and the energy of the light emitted from the light source at a constant level.

The angle adjustment section 112 adjusts the incident angle of the excitation light α with respect to the metal film 30, specifically the interface between the prism 20 and the metal film 30 (film forming surface 22). In order to apply the excitation light α at a predetermined incident angle toward a predetermined position of the metal film 30 (film forming surface 22), the angle adjustment section 112 rotates the optical axis of the excitation light α and the chip holder 141 relative to each other. In the present embodiment, the angle adjustment section 112 rotates the light source unit 111 around an axis orthogonal to the optical axis of the excitation light α (axis perpendicular to the sheet surface of FIG. 1) as a center axis on the metal film 30.

The light source control section 113 controls various devices included in the light source unit 111 to adjust the power of the excitation light α from the light source unit 111, the emission time, or the like. The light source control section 113 includes a known computer or a microcomputer including an arithmetic apparatus, a control apparatus, a storage apparatus, an input apparatus, and an output apparatus.

The light receiving unit 120 detects light (plasmon scattered light β or fluorescence γ) emitted from the metal film 30. The light receiving unit (light detector) 120 is arranged so as to face a surface of the metal film 30 of the detection chip 10 held by the chip holder 141, the surface not facing the prism 20. The light receiving unit 120 includes: a first lens 122, an optical filter 123, a second lens 124, and a light receiving sensor 125 arranged in the light receiving optical system unit 121; a position switching mechanism 126; and a light receiving sensor control section 127. The light receiving unit 120 may further include a condenser lens group, an aperture stop, a fluorescent filter, or the like.

The first lens 122 is, for example, a condenser lens, and collects light emitted from the metal film 30. The second lens 124 is, for example, an imaging lens, and focuses the light collected by the first lens 122 on the light receiving surface of the light receiving sensor 125. The optical path between the two lenses is substantially parallel.

The optical filter 123 is arranged between the first lens 122 and the second lens 124. The optical filter 123 transmits only the fluorescent component of the incident light, and removes the excitation light component (plasmon scattered light β). By removing the excitation light component using the optical filter 123, it is possible to detect the fluorescence γ with a high S/N ratio. Exemplary types of the optical filter 123 include an excitation light reflection filter, a short wavelength cut-off filter, and a band pass filter.

The light receiving sensor 125 detects plasmon scattered light β and fluorescence γ emitted from the detection chip 10. The type of the light receiving sensor 125 is not particularly limited as long as the above object can be achieved, still, it is preferable to use a sensor having a small variance in the detection value even when the light receiving amount increases. An example of the light receiving sensor 125 is a photodiode (PD).

The position switching mechanism 126 switches the position of the optical filter 123 to position on the optical path or position outside the optical path in the light receiving optical system unit 121. More specifically, the optical filter 123 is arranged on the optical path in the light receiving optical system unit 121 when the optical blank value or the fluorescence value is measured. The optical filter 123 is arranged outside the optical path when the light receiving sensor 125 detects the plasmon scattered light β.

The light receiving sensor control section 127 detects the sensitivity of the light receiving sensor 125, manages the sensitivity of the light receiving sensor 125 by the detected output value, and controls the sensitivity of the light receiving sensor 125 to obtain an appropriate output value. The light receiving sensor control section 127 includes a known computer or a microcomputer including an arithmetic apparatus, a control apparatus, a storage apparatus, an input apparatus, and an output apparatus.

The liquid delivery unit (liquid delivery section) 130 supplies a liquid such as a specimen, a fluorescent labeling liquid, a washing liquid or the like into the flow path 44 of the detection chip 10 held by the chip holder 141, or remove these liquids from inside the flow path 44. The liquid delivery unit 130 includes a liquid chip 131, a pump main body (pump) 132, and a liquid delivery pump drive mechanism 134.

The liquid chip 131 is a container that stores a liquid such as a specimen, a fluorescent labeling liquid, and a washing liquid. The liquid chip 131 is generally arranged as a plurality of containers arranged in accordance with the type of liquid, or as a chip integrating a plurality of containers.

The pump main body (pump) 132 includes a plunger pump 1331 and a pump nozzle 1332. The plunger pump 1331 includes a syringe and a plunger (none of which being illustrated). The plunger reciprocates within the syringe. Delivery (suction and dispensation) of the liquid is quantitatively performed by the reciprocating motion of the plunger. The pump nozzle 1332 detachably holds the nozzle 160.

The liquid delivery pump drive mechanism 134 includes a plunger drive apparatus and an apparatus for moving the nozzle 160. The plunger drive apparatus is an apparatus for reciprocating the plunger and includes a stepping motor, for example. From the viewpoint of managing a residual liquid amount of the detection chip 10, it is preferable to use the drive apparatus including the stepping motor because of its capability of managing the liquid delivery amount and the liquid delivery speed. The apparatus for moving the nozzle 160 moves the nozzle 160 in two directions, that is, an axial direction (for example, the vertical direction) of the nozzle 160 and a direction crossing the axial direction (for example, the horizontal direction). The apparatus for moving the nozzle 160 includes a robot arm, a biaxial stage or a vertically movable turntable, for example.

The liquid delivery unit 130 sucks various liquids from the liquid chip 131 and supplies the sucked liquid into the flow path 44 of the detection chip 10. Movement of the plunger causes the liquid to reciprocate in the flow path 44, so as to allow the liquid to be appropriately stirred in the stirring through hole 42 covered by the sheet 60. This makes it possible to promote the uniformity of the concentration distribution of the liquid and the reaction (for example, the primary reaction and the secondary reaction) in the flow path 44. The liquid in the flow path 44 is again sucked by the liquid delivery nozzle 160 and then discharged to the liquid chip 131 or the like. By repeating each of operation procedures, it is possible to perform reaction, washing, or the like, with various liquids, and to arrange the detection target substance labeled with a fluorescent substance in the flow path 44.

Figure 4A:
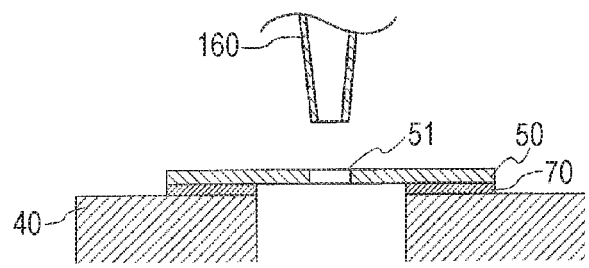
FIG. 4A to FIG. 4C are partial schematic sectional views of a detection chip according to an embodiment of the present invention for explaining the function of an elastic sheet.
Figure 4B:
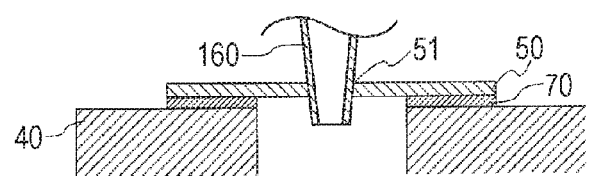
Figure 4C:
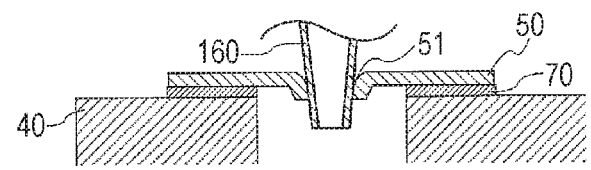

The function of the elastic sheet 50 for maintaining the pressure in the flow path 44 at the time of liquid delivery will be described. FIG. 4A to 4C are partial schematic sectional views of the detection chip 10 according to the present embodiment for explaining the function of the elastic sheet 50. FIG. 4A illustrates a state before the nozzle 160 is inserted into the flow path 44 via the penetrating portion 51. FIG. 4B illustrates a state where the nozzle 160 is inserted into the flow path 44 via the penetrating portion 51 so as to allow the elastic sheet 50 to come into contact with the nozzle 160. FIG. 4C illustrates a state where the nozzle 160 is inserted until being positioned at the liquid delivery height so as to close the penetrating portion 51.

The nozzle 160 according to the present embodiment has a tapered surface whose outer diameter increases away from the end of the nozzle (refer to FIG. 4A). With this configuration, in the middle of insertion of the nozzle 160 into the flow path 44 via the penetrating portion 51, the elastic sheet 50 comes into contact with the nozzle 160 at a predetermined position (refer to FIG. 4B). Then, as the nozzle 160 is further deeply inserted so as to close the penetrating portion 51, the elastic sheet 50 is pressed and expanded by the nozzle 160. At this time, since the elastic sheet 50 tries to return to its original shape by the restoring force, the nozzle 160 is tightened by the elastic sheet 50 (refer to FIG. 4C). With this configuration, when the nozzle 160 is inserted so as to close the penetrating portion 51, the elastic sheet 50 comes into contact with the nozzle 160 to prevent generation of the gap of the opening portion 45, making it possible to maintain the internal pressure inside the flow path 44, generated at liquid delivery. This results in the suppression of air leakage from the gap of the opening portion 45 when the liquid is extruded from the nozzle 160, making it possible to press the liquid to flow into the flow path 44. Moreover, when the liquid is sucked from the inside of the flow path 44 to the nozzle 160, air would not enter through the gap of the opening portion 45, enabling suction of the liquid inside the flow path 44. In this manner, the SPFS apparatus 100 according to the present embodiment can appropriately perform liquid delivery.

From the viewpoint of increasing the restoring force of the elastic sheet 50 for enhancing the adhesion between the nozzle 160 and the elastic sheet 50, the material of the elastic sheet 50 is preferably a material having a high elastic force. Moreover, the thickness of the elastic sheet 50 is preferably great. Furthermore, it is preferable that the size of the penetrating portion 51 (maximum length of the opening of the hole or the maximum length of the notch) be small. It is preferable, however, to appropriately adjust the material and thickness of the elastic sheet 50 and the size of the penetrating portion 51 so as to avoid application of excessive burden on the nozzle 160 and the SPFS apparatus 100.

The conveyance unit 140 conveys and fixes the detection chip 10 to an installation position, a detection position, or a liquid delivery position. Note that the "installation position" is a position for installing the detection chip 10 in the SPFS apparatus 100. The "detection position" is a position at which the light receiving unit 120 detects the fluorescence γ generated when the light emission unit 110 emits the excitation light α to the detection chip 10. Furthermore, the "liquid delivery position" is a position at which the liquid delivery unit 130 supplies a liquid into the flow path 44 of the detection chip 10 or removes the liquid in the flow path 44 of the detection chip 10.

The conveyance unit 140 includes the chip holder 141 and a conveyance stage 142.

The chip holder 141 is fixed on the conveyance stage 142 and detachably holds the detection chip 10. The shape of the chip holder 141 is a shape that can hold the detection chip 10 and does not obstruct the optical path of light such as the excitation light α, the fluorescence γ, and the reflected light.

The conveyance stage 142 moves the chip holder 141 in one direction and its opposite direction. The conveyance stage 142 is also shaped so as not to obstruct the optical path of light such as the excitation light α, the fluorescence γ, and the reflected light. The conveyance stage 142 is driven by a stepping motor, for example.

The control section 150 controls the angle adjustment section 112, the light source control section 113, the position switching mechanism 126, the light receiving sensor control section 127, the liquid delivery pump drive mechanism 134, and the conveyance stage 142. Moreover, the control section 150 also functions as a processing section for calculating a signal value indicating the presence or amount of the detection target substance on the basis of a detection result of the light receiving sensor 125. The control section 150 includes a known computer or a microcomputer including an arithmetic apparatus, a control apparatus, a storage apparatus, an input apparatus, and an output apparatus.

(Configuration of Nozzle)

The nozzle 160 can store liquids and is inserted into the liquid chip 131 or the flow path 44 at the time of liquid delivery. The nozzle 160 is attached to the pump nozzle 1332 of the SPFS apparatus 100. The size and shape of the nozzle 160 are not particularly limited. As described above, on the detection chip 10 according to the present embodiment, the nozzle 160 is inserted into the flow path 44 so as to close the penetrating portion 51 until the end of the nozzle 160 is positioned at the liquid delivery height. The shape of the nozzle 160 may be a tapered shape in which the outer diameter increases away from the end of the nozzle. The shape of the nozzle 160 according to the present embodiment is a tapered shape in which the outer diameter of the nozzle 160 increases away from the end of the nozzle. An example of the nozzle 160 is a pipette tip.

In a case where the nozzle 160 is replaceable, there is no need to wash the nozzle 160. This is preferable from the viewpoint of preventing contamination of impurities or the like. In a case where the nozzle 160 is not replaceable, it is still possible to use the apparatus the without replacement of the nozzle 160 by an additional configuration for washing the interior of the nozzle 160 to the SPFS apparatus 100.

(Configuration of Test Kit)

The detection chip 10 and the nozzle 160 can be used as a test kit for detecting a detection target substance in a specimen. At this time, as described above, the maximum length of the opening of the hole or the maximum length of the notch is smaller than the outer diameter of the nozzle 160 at a position from the end of the nozzle 160 in a longitudinal direction of the nozzle 160 corresponding to a depth from the bottom surface of the flow path 44 to the elastic sheet 50.

(Detection Operation of SPFS Apparatus)

Figure 5:
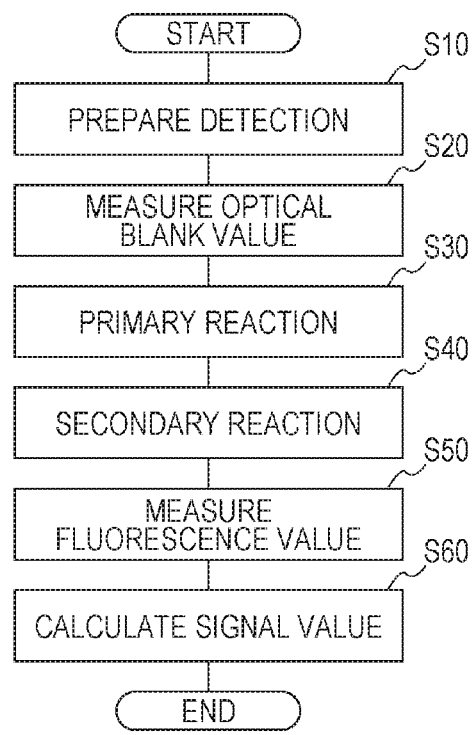
FIG. 5 is a flowchart illustrating an example of an operation procedure of the surface plasmon-field enhanced fluorescence detection apparatus according to an embodiment of the present invention.

Next, detection operation (detection method according to the present embodiment) of the SPFS apparatus 100 will be described. FIG. 5 is a flowchart illustrating an example of the operation procedure of the SPFS apparatus 100.

First, preparation for detection is performed (step S10). Specifically, the detection chip 10 is prepared, and the detection chip 10 is installed in the chip holder 141 arranged at an installation position of the SPFS apparatus 100. In the case where a moisturizing agent is present on the metal film 30 of the detection chip 10, the metal film 30 is washed to remove the moisturizing agent to enable the capture agent to appropriately capture the detection target substance. At this time, the liquid delivery unit 130 inserts the nozzle 160 into the flow path 44 via the penetrating portion 51 until the end of the nozzle 160 is positioned at the liquid delivery height, and supplies a buffer solution or the like into the flow path 44 to wash the inside of the flow path 44 in a state where the nozzle 160 is in contact with the elastic sheet 50 so as to close the penetrating portion 51. Subsequently, after washing the inside of the flow path 44, the liquid delivery unit 130 inserts the nozzle 160 into the flow path 44 via the penetrating portion 51 until the end of the nozzle 160 is positioned at the liquid delivery height, and removes the buffer solution from the flow path 44 in a state where the nozzle 160 is in contact with the elastic sheet 50 so as to close the penetrating portion 51.

Next, light containing light having the same wavelength as the fluorescence γ is detected in a state where no fluorescent substance is present on the metal film 30, and the optical blank value is measured (step S20). Here, the "optical blank value" means the amount of background light emitted above the detection chip 10.

Specifically, the control section 150 controls the conveyance stage 142 to move the detection chip 10 from the installation position to the detection position. Thereafter, the control section 150 controls the light source control section 113 to emit the excitation light α at a predetermined position of the metal film 30 from the light source unit 111 of the light emission unit 110. At the same time, the control section 150 controls the light receiving sensor control section 127 to detect the light by the light receiving sensor 125. With this procedure, the optical blank value is measured. The measured optical blank value is transmitted to and stored in the control section (processing section) 150.

Next, the detection target substance in the specimen and the capture agent are bound to each other (primary reaction; step S30). Specifically, the control section 150 controls the conveyance stage 142 to move the detection chip 10 from the detection position to the liquid delivery position. Thereafter, the control section 150 controls the liquid delivery pump drive mechanism 134 to suck the specimen in the liquid chip 131 into the nozzle 160, and supplies the sucked specimen into the flow path 44. At this time, the liquid delivery unit 130 inserts the nozzle 160 into the flow path 44 via the penetrating portion 51 until the end of the nozzle 160 is positioned at the liquid delivery height, and supplies the specimen into the flow path 44 in a state where the nozzle 160 is in contact with the elastic sheet 50 so as to close the penetrating portion 51. Then, the liquid delivery unit 130 reciprocates the specimen in the flow path 44 by repeating suction and dispensation. In the present embodiment, the liquid delivery unit 130 reciprocally delivers liquid by one nozzle 160 inserted in the flow path 44 so as to close the penetrating portion 51. With this configuration, it is possible to cause at least a portion of a detection target substance to be directly or indirectly bound to the metal film 30 in a case where the detection target substance is present in the specimen. Subsequently, the nozzle 160 is inserted into the flow path 44 via the penetrating portion 51 until the end of the nozzle 160 is positioned at the liquid delivery height, and the control section 150 controls the liquid delivery pump drive mechanism 134 to suck the specimen inside the flow path 44 into the nozzle 160 in a state where the nozzle 160 is in contact with the elastic sheet 50 so as to close the penetrating portion 51, so as to remove the specimen from the flow path 44. Furthermore, the inside of the flow path 44 is washed with a buffer solution or the like to remove substances not captured by the capture agent. At this time, the liquid delivery unit 130 inserts the nozzle 160 into the flow path 44 via the penetrating portion 51 until the end of the nozzle 160 is positioned at the liquid delivery height, and supplies the buffer solution or the like into the flow path 44 to wash the inside of the flow path 44 in a state where the nozzle 160 is in contact with the elastic sheet 50 so as to close the penetrating portion 51. Subsequently, after washing the inside of the flow path 44, the liquid delivery unit 130 inserts the nozzle 160 into the flow path 44 via the penetrating portion 51 until the end of the nozzle 160 is positioned at the liquid delivery height, and removes the buffer solution from the flow path 44 in a state where the nozzle 160 is in contact with the elastic sheet 50 so as to close the penetrating portion 51.

Subsequently, the detection target substance bound to the capture agent is labeled with a fluorescent substance (secondary reaction; step S40). Specifically, the control section 150 controls the liquid delivery pump drive mechanism 134 to suck the fluorescent labeling liquid in the liquid chip 131 into the nozzle 160, and inserts the nozzle 160 into the flow path 44 via the penetrating portion 51 until the end of the nozzle 160 is positioned at the liquid delivery height, and supplies the sucked fluorescent labeling liquid into the flow path 44 in a state where the nozzle 160 is in contact with the elastic sheet 50 so as to close the penetrating portion 51, so as to allow the fluorescent labeling liquid to reciprocate within the flow path 44. This enables the detection target substance to be labeled with a fluorescent substance. An example of the fluorescent labeling liquid is a buffer solution containing an antibody (secondary antibody) labeled with a fluorescent substance. Subsequently, the nozzle 160 is inserted into the flow path 44 via the penetrating portion 51 until the end of the nozzle 160 is positioned at the liquid delivery height, and the control section 150 controls the liquid delivery pump drive mechanism 134 to suck the fluorescent labeling solution inside the flow path 44 into the nozzle 160 in a state where the nozzle 160 is in contact with the elastic sheet 50 so as to close the penetrating portion 51, so as to remove the fluorescent labeling liquid from the flow path 44. Furthermore, the inside of the flow path 44 is washed with a buffer solution or the like to remove free fluorescent substances or the like. At this time, the liquid delivery unit 130 inserts the nozzle 160 into the flow path 44 via the penetrating portion 51 until the end of the nozzle 160 is positioned at the liquid delivery height, and supplies the buffer solution or the like into the flow path 44 to wash the inside of the flow path 44 in a state where the nozzle 160 is in contact with the elastic sheet 50 so as to close the penetrating portion 51. Subsequently, after washing the inside of the flow path 44, the liquid delivery unit 130 inserts the nozzle 160 into the flow path 44 via the penetrating portion 51 until the end of the nozzle 160 is positioned at the liquid delivery height, and removes the buffer solution from the flow path 44 in a state where the nozzle 160 is in contact with the elastic sheet 50 so as to close the penetrating portion 51.

In steps S30 and S40, the maximum length of the opening of the hole (penetrating portion 51) is smaller than the outer diameter of the nozzle 160 at a portion coming in contact with the elastic sheet 50 when the nozzle 160 is inserted into the flow path 44 via the penetrating portion 51 until the end of the nozzle is positioned at the liquid delivery height (that is, when the liquid delivery unit 130 inserts the nozzle 160 into the flow path 44 via the penetrating portion 51). For example, the maximum length of the opening of the hole (penetrating portion 51) is preferably ½ or below of the outer diameter of the nozzle 160 at a portion coming in contact with the elastic sheet 50 when the nozzle 160 is inserted into the flow path 44 to close the penetrating portion 51. Thereby, the nozzle 160 and the elastic sheet 50 can be brought into close contact with each other with higher adhesion, making it possible to perform liquid delivery appropriately.

Subsequently, the excitation light α is emitted to the metal film 30 in a state where the detection target substance labeled with a fluorescent substance is directly or indirectly bound onto the metal film 30, so as to detect the fluorescence γ emitted from the fluorescent substance labeling the detection target substance on the metal film 30 to measure the fluorescence value (step S50).

Specifically, the control section 150 controls the conveyance stage 142 to move the detection chip 10 from the liquid delivery position to the detection position. Thereafter, the control section 150 controls the light source control section 113 to emit the excitation light α toward the metal film 30 from the light source unit 111 of the light emission unit 110. At the same time, the control section 150 controls the light receiving sensor control section 127 to detect the fluorescence γ by the light receiving sensor 125. With this procedure, the fluorescence value is measured. The measured fluorescence value is transmitted to the control section (processing section) 150 and recorded.

Finally, a signal value indicating the presence or amount of the detection target substance is calculated (step S60). The fluorescence value mainly includes a fluorescent component (signal value) derived from a fluorescent substance labeling a detection target substance and an optical blank value derived from noise. Accordingly, by subtracting the optical blank value obtained in step S20 from the fluorescence value obtained in step S50, the control section (processing section) 150 can calculate a signal value correlated with the amount of the detection target substance. The signal value is converted into the amount or concentration of the detection target substance by a calibration curve prepared in advance.

With the above procedure, it is possible to detect the presence or amount of the detection target substance in the specimen.

As described above, the conventional detection chip uses an elastic sheet having a three-layer structure in which a polymer sheet, an aluminum sheet, and a polymer sheet are laminated in this order. The elastic sheet having a three-layer structure is used because using a single-layer polymer sheet in a conventional detection chip has a problem that since the polymer sheet has ductility, the polymer sheet stretches even when a nozzle is pressed, leading to a failure in appropriately breaking the membrane. In contrast, the detection chip 10 according to the present embodiment has a configuration in which the elastic sheet 50 includes the penetrating portion 51, and thus, there is no need to break the elastic sheet 50. With this configuration, even with the single-layer elastic sheet 50, it is possible to bring the nozzle 160 into contact with the elastic sheet 50 so as to close the penetrating portion 51 and appropriately deliver the liquid. This results in enabling the detection chip 10 according to the present embodiment to reduce the cost of the detection chip 10 due to the reduction of the material of the elastic sheet 50.

(Effects)

As described above, with application of the detection chip 10 according to the present embodiment, it is possible to appropriately perform liquid delivery in a state where the nozzle 160 is brought into contact with the elastic sheet 50 so as to close the penetrating portion 51 without tearing the elastic sheet 50. In the detection chip 10 according to the present embodiment, there is no need to break the elastic sheet, so it is possible to lower the rigidity required for the liquid delivery nozzle 160 and the detection apparatus, and there is no need to ensure a space for the breakage, leading to miniaturization of the detection chip 10. Moreover, it is possible to appropriately perform liquid delivery with the detection method and the detection apparatus according to the present embodiment, enabling detection of the presence or amount of the detection target substance with high accuracy. Furthermore, with the use of a testing kit according to the present embodiment, it is possible to detect the presence or amount of a detection target substance with high accuracy.

EXAMPLES

Hereinafter, the present invention will be described in detail with reference to examples, although the present invention is not limited by these examples. In the following examples, the numerical value of the pressure represents a difference from the atmospheric pressure. For example, when the pressure is described as 30 [kPa] to 200 [kPa], considering the atmospheric pressure, the pressure in the flow path is about 130 [kPa] to 300 [kPa].

Example 1

1. Preparation of Test Kit (Detection Chip and Nozzle)

Prepared was a detection chip in which the first through hole of the flow path lid is closed with an elastic sheet having a hole of ϕ 0.5 mm or ϕ 1 mm as a penetrating portion. For comparison, also prepared was a conventional detection chip in which the first through hole of the flow path lid is closed with an elastic sheet without a hole. The detection chip having an elastic sheet with a hole used a linear low density polyethylene (LLDPE) sheet having a thickness of 60 μm as the elastic sheet. The detection chip having an elastic sheet without a hole used a laminated body obtained by laminating an LLDPE sheet having a thickness of 50 μm, an aluminum sheet having a thickness of 9 μm, and an LLDPE sheet having a thickness of 50 μm in this order as an elastic sheet. In addition, a nozzle having an outer diameter of 1 mm at the end was prepared. When the nozzle is inserted into the flow path through the hole until its end is positioned at the liquid delivery height, the outer diameter of the nozzle at the contact portion between the elastic sheet and the nozzle is 2.3 mm.

2. Measurement of Breakage Distance or Penetration Distance and Maximum Force Applied to the Nozzle Toward each of detection chips, the liquid delivery nozzle was lowered with reference to a state in which the end of the nozzle was at the same height as the upper surface of the elastic sheet. With the detection chip having an elastic sheet without a hole, a distance (hereinafter also referred to as "breakage distance") the nozzle traveled until the end of the nozzle broke the elastic sheet was measured. With the detection chip having an elastic sheet with a hole, a distance (hereinafter also referred to as "penetration distance") the nozzle traveled until the end of the nozzle passes through the hole on the elastic sheet was measured. At the same time, the maximum force applied to the nozzle until the end of the nozzle was inserted to the liquid delivery height was measured.

Figure 6A:
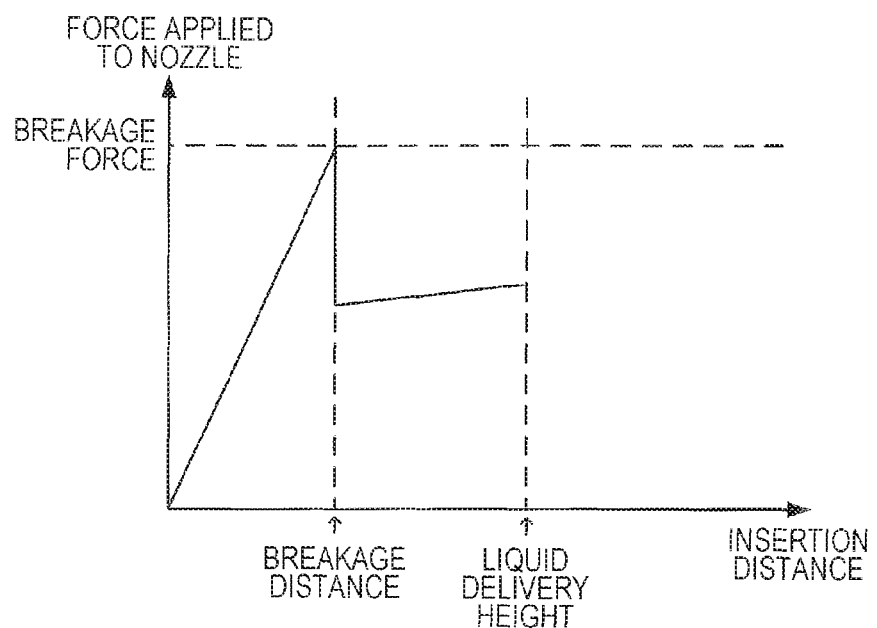
FIG. 6A and FIG. 6B are graphs illustrating a relationship between an insertion distance of the nozzle and the force applied to the nozzle.
Figure 6B:
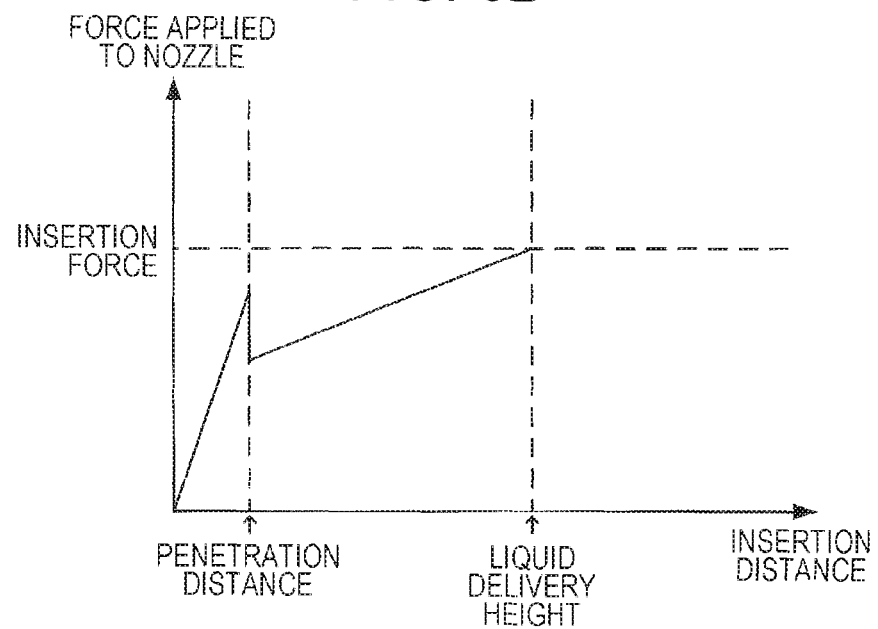

FIG. 6A and FIG. 6B are graphs illustrating a relationship between an insertion distance of the nozzle and the force applied to the nozzle. FIG. 6A illustrates a graph related to a detection chip having an elastic sheet without a hole and FIG. 6B illustrates a graph related to a detection chip having an elastic sheet with a hole. When the nozzle is lowered, the nozzle is pressed against the elastic sheet. During this time, the force applied to the nozzle increases as illustrated in FIG. 6A and FIG. 6B. Next, the nozzle breaks the elastic sheet with a detection chip having an elastic sheet without a hole, while the end of the nozzle passes through the hole with the detection chip having the elastic sheet with a hole. At this time, the force applied to the nozzle suddenly decreases. The nozzle is then inserted into the hole (or the hole formed by the breakage) until its end is positioned at the liquid delivery height. Meanwhile, since the nozzle presses and expands the hole of the elastic sheet, the force applied to the nozzle increases. As illustrated in FIG. 6A, in the case of the detection chip having an elastic sheet without holes, the maximum force applied to the nozzle until the end of the nozzle is inserted up to the liquid delivery height is the force applied to the nozzle immediately before the breakage (hereinafter also referred to as "breaking force"). Moreover, as illustrated in FIG. 6B, in the case of the detection chip having an elastic sheet without a hole, the maximum force applied to the nozzle until the end of the nozzle is inserted up to the liquid delivery height is the force applied to the nozzle when the end of the nozzle reaches the liquid delivery height (hereinafter also referred to as "insertion force").

3. Results

Figure 7A:
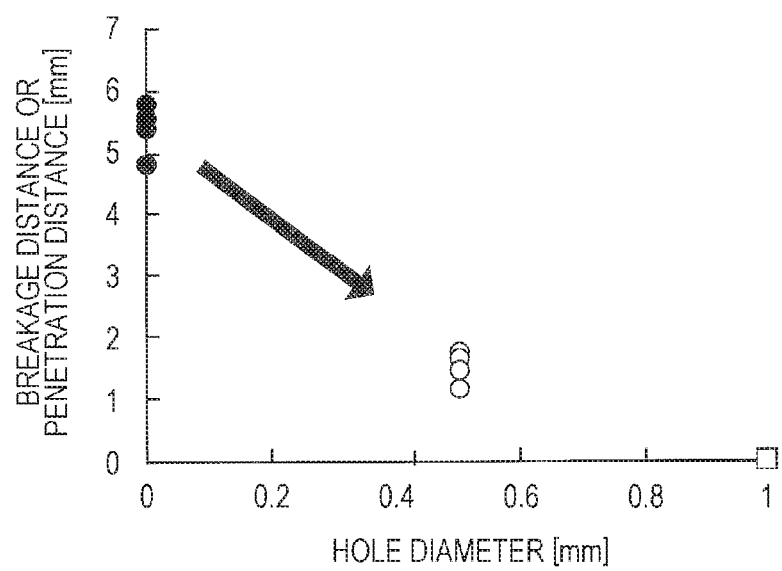
FIG. 7A and FIG. 7B are graphs illustrating a relationship between the diameter of a hole (penetrating portion) and a breakage distance or a penetration distance or breakage force or insertion force.
Figure 7B:
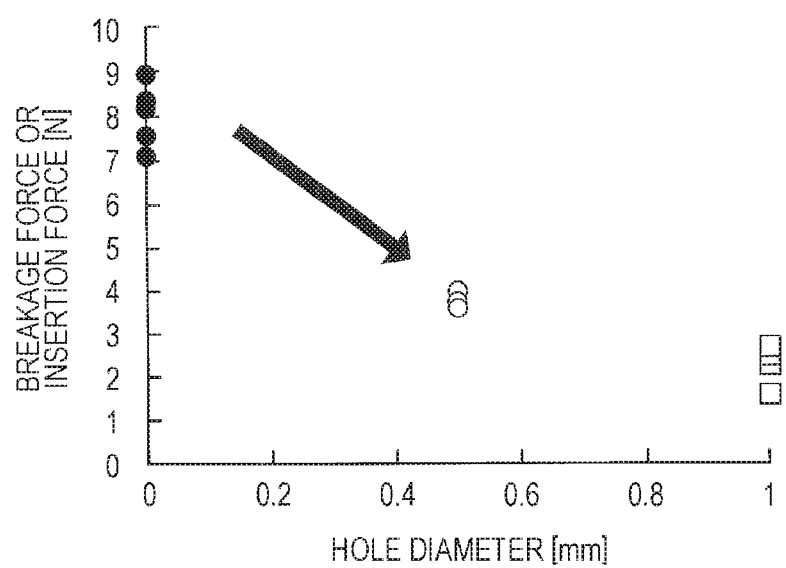

FIG. 7A is a graph illustrating a relationship between the diameter of the hole and the breakage distance or penetration distance. FIG. 7B is a graph illustrating a relationship between the diameter of the hole and the breakage force or insertion force. In FIG. 7A and FIG. 7B, filled circles (●) indicate results for the detection chip having an elastic sheet without a hole, white open circles (○) indicate results of a detection chip having an elastic sheet with a hole of ϕ 0.5 mm in diameter, and open squares (□) indicate the results of a detection chip having an elastic sheet with a hole of ϕ 1.0 mm. In FIG. 7A, the horizontal axis illustrates the diameter [mm] of the hole, and the vertical axis illustrates the breakage distance or penetration distance [mm]. In FIG. 7B, the horizontal axis illustrates the diameter [mm] of the hole and the vertical axis illustrates the breakage force or insertion force [N].

As illustrated in FIG. 7A, both the penetration distance and insertion force were reduced with the detection chip having an elastic sheet with a hole compared with the result (breakage distance and breakage force) for a detection chip having an elastic sheet without a hole. This is because, there is a need to break the elastic sheet in the detection chip having an elastic sheet without a hole, whereas there is no need to break the elastic sheet with a detection chip having an elastic sheet with a hole.

The above results indicate that the detection chip according to the present embodiment decreases the penetration distance and thus reduces the height required for the detection chip, making it possible to miniaturize the detection chip. In addition, the result indicates the reduction in the insertion force, making it possible to reduce the load applied to the nozzle and the detection apparatus, and to lower the rigidity required for the nozzle and the detection apparatus.

Example 2

1. Preparation of Test Kit (Detection Chip and Nozzle)

Prepared was a detection chip in which the first through hole of the flow path lid is closed with an elastic sheet having a hole of ϕ 0.5 mm, ϕ 1 mm, ϕ 1.5 mm, or ϕ 2 mm, as a penetrating portion. For comparison, also prepared was a conventional detection chip in which the first through hole of the flow path lid is closed with an elastic sheet without a hole, same as the chip used in Example 1. The detection chip having an elastic sheet with a hole used a linear low density polyethylene (LLDPE) sheet having a thickness of 60 μm as the elastic sheet. As the nozzle, the same nozzle as used in Example 1 was prepared.

2. Evaluation of Sealability of Detection Chip

With each of detection chips, the second through hole of the flow path lid is closed, and the plunger is controlled with the liquid delivery pump drive mechanism in a state where the nozzle is inserted so as to close the hole until the end of the nozzle is positioned at the liquid delivery height, so as to compress the air in the flow path to increase the pressure to be set at a predetermined pressure of 30 [kPa] to 200 [kPa] within the flow path. The sealability of each of the detection chips was evaluated by the following criteria. From the viewpoint of withstanding practical use, a case of withstanding a pressure of at least 50 kPa was judged as acceptable.

○: Successful in holing the pressure in the flow path

Δ: Substantially successful in holding the pressure in the flow path with a slight level of leakage Table 1 illustrates a relationship between the diameter of the hole, the pressure in the flow path, and the sealability of each of the detection chips.

TABLE 1

| | | HOLE DIAMETER ϕ [mm] | | | | |
| --- | --- | --- | --- | --- | --- | --- |
| | | 0 | 0.5 | 1 | 1.5 | 2 |
| PRESSURE [kPa] | 30 | ○ | ○ | ○ | ○ | Δ |
| | 50 | ○ | ○ | ○ | Δ | Δ |
| | 100 | ○ | ○ | ○ | Δ | Δ |
| | 200 | ○ | ○ | Δ | Δ | Δ |

As illustrated in Table 1, it was found that the smaller the diameter of the hole, the more the pressure inside the flow path can be maintained. This is probably because the smaller the diameter of the hole, the higher the adhesion between the nozzle and the elastic sheet becomes. This result indicates that, with the detection chip according to the present invention, it is possible to sufficiently maintain the pressure in the flow path provided that the diameter of the hole is within a predetermined range with respect to the outer diameter of the nozzle even when a hole is formed in the elastic sheet. Moreover, when the nozzle is inserted into the flow path through the hole until its end is positioned at the liquid delivery height, the outer diameter of the nozzle at the portion coming in contact with the elastic sheet is 2.3 mm. This indicates that it is preferable supply the liquid in a state where the nozzle is inserted into the flow path via the hole such that the maximum length of the opening of the hole becomes ½ or below of the outer diameter of the nozzle at a portion coming in contact with the elastic sheet.

Example 3

1. Preparation of Test Kit (Detection Chip and Nozzle)

Prepared was a detection chip in which the first through hole of the flow path lid is closed with an elastic sheet having a hole of ϕ 1.5 mm as a penetrating portion. As the elastic sheet, a PET sheet (thickness 38 μm) having a tensile elongation at break of 150%, a nylon sheet (thickness 50 μm) having a tensile elongation at break of 500%, an LLDPE sheet (thickness 80 μm) having a tensile elongation at break of 1000%, or an LLDPE sheet (thickness 100 μm) having a tensile elongation at break of 1700% were used. The tensile elongation at break was evaluated by cutting out a test piece of 5 mm×60 mm from each elastic sheet and conducting a tensile test by sandwiching 25 mm portions at both ends of the test piece in the longitudinal direction with a grip. As the nozzle, the same nozzle as used in Example 1 was prepared.

2. Evaluation of Sealability of Detection Chip

With each of detection chips, the second through hole of the flow path lid is closed, and the liquid delivery pump drive mechanism is used to compress the air in the flow path in a state where the nozzle is inserted so as to close the hole until the end of the nozzle is positioned at the liquid delivery height, so as to set the pressure in the flow path to 20 [kPa]. The sealability of each of the detection chips was evaluated by the following criteria.

◦: Successful in holing the pressure in the flow path x: Substantially successful in holding the pressure in the flow path with a slight level of leakage Table 2 illustrates a relationship between the diameter of the hole, the tensile elongation at break of the elastic sheet and the sealability of each of the detection chips.

TABLE 2

|  |  | TENSILE ELONGATION AT BREAK [%] | | | |
| --- | --- | --- | --- | --- | --- |
|  |  | 150 | 500 | 1000 | 1700 |
| HOLE DIAMETER ϕ [mm] | 1.5 | x | ◦ | ◦ | ◦ |

As illustrated in Table 2, it was found that the detection chip having an elastic sheet with holes having a diameter of 1.5 mm can maintain the pressure in the flow path when the tensile elongation at break is greater. This is probably because the greater the tensile elongation at break of the elastic sheet, the more the elastic sheet can be stretched by the nozzle inserted so as to close the hole, and this increased the close contact portion between the nozzle and the elastic sheet, so as to enhance the adhesion between the nozzle and the elastic sheet. From this result, it was found that the pressure inside the flow path can be sufficiently maintained as long as the tensile elongation at break of the elastic sheet is within a predetermined range. In contrast, in this example, when the tensile elongation at break was 150%, leakage was slightly confirmed since the elastic sheet and the nozzle were not in close contact with each other.

Example 4

1. Preparation of Test Kit (Detection Chip and Nozzle)

Prepared was a detection chip in which the first through hole of the flow path lid is closed with an elastic sheet having a hole of ϕ 1 mm, ϕ 1.5 mm, or ϕ 2.0 mm, as a penetrating portion. As the elastic sheet, a PET sheet having a tear strength of 70 mN and a thickness of 38 μm, an non-stretched polypropylene sheet having a tear strength of 200 mN and a thickness of 60 μm, and an LLDPE sheet having a tear strength of 2000 mN and a thickness of 100 μm were used. The tear strength of each of the elastic sheets was evaluated by cutting out a test piece of 2.3 cm×5 cm from each of the elastic sheets and tearing the test piece in a direction passing through the center of the test piece along the minor axis direction. As the nozzle, the same nozzle as used in Example 1 was prepared.

2. Evaluation of Sealability of Detection Chip

With each of detection chips, the second through hole of the flow path lid is closed, and the liquid delivery pump drive mechanism is used to control the plunger to compress the air in the flow path in a state where the nozzle is inserted so as to close the hole until the end of the nozzle is positioned at the liquid delivery height, so as to set the pressure in the flow path to 20 [kPa]. The sealability of each of the detection chips was evaluated by the following criteria.

◦: Successful in holing the pressure in the flow path x: Substantially successful in holding the pressure in the flow path with a slight level of leakage Table 3 illustrates a relationship between the diameter of the hole, the tear strength of the elastic sheet and the sealability of each of detection chips.

TABLE 3

|  |  | TEAR STRENGTH [mN] | | |
| --- | --- | --- | --- | --- |
|  |  | 70 | 200 | 2000 |
| HOLE DIAMETER ϕ [mm] | 1.0 | x | ◦ | ◦ |
|  | 1.5 | x | ◦ | ◦ |
|  | 2.0 | ◦ | ◦ | ◦ |

As illustrated in Table 3, it was found that the greater the diameter of the hole, the more successfully the pressure inside the flow path can be maintained even when the tear strength is small. This is because the elastic sheet is pressed and expanded more when the nozzle is inserted when the diameter of the hole is small as compared with the case where the diameter of the hole is great, and thus, the load of the inserted nozzle to the elastic sheet tore the elastic sheet when the tearing strength is small. From this result, it was found that the pressure inside the flow path can be sufficiently maintained as long as the tearing strength of the elastic sheet is within a predetermined range even when the diameter of the hole is great. According to this example, it is estimated that it is possible to maintain high sealability regardless of the length of the hole diameter when the tear strength of the elastic sheet is 80 mN to 3000 mN. In contrast, in the present example, when the diameter of the hole was 1.0 mm or 1.5 mm and the tear strength was 70 mN, the nozzle was not in contact with the elastic sheet so as to close the hole, leading to a slight level of leakage.

This application claims priority based on Japanese Patent Application No. 2015-224213 filed on Nov. 16, 2015. The contents described in the application specification and drawings are all incorporated herein by reference.

INDUSTRIAL APPLICABILITY

With the detection method, the detection apparatus, and the test kit according to the present invention, it is possible to detect a detection target substance with high reliability, and thus applicable for clinical examination, for example.

REFERENCE SIGNS LIST

10 Detection chip
20 Prism
21 Incident surface
22 Film forming surface
23 Emission surface
30 Metal film
40 Flow path lid
41 First through hole
42 Stirring through hole
43 Flow path groove
44 Flow path
45 Opening portion 50, 50', 50" Elastic sheet
51, 51', 51" Penetrating portion
60 Sheet
61 Air hole
70 Adhesive sheet
71 Second through hole
80 Double-faced tape
100 Surface plasmon resonance fluorescence analyzer (SPFS apparatus)
110 Light emission unit (light emission section)
111 Light source unit
112 Angle adjustment mechanism
113 Light source control section
120 Light receiving unit (light detector)
121 Light receiving optical system unit
122 First lens group
123 Optical filter
124 Second lens group
125 Light receiving sensor
126 Position switching mechanism
127 Light receiving sensor control section
130 Liquid delivery unit (liquid delivery section)
131 Liquid chip
132 Pump main body
1331 Plunger pump
1332 Pump nozzle
134 Liquid delivery pump drive mechanism
140 Conveyance unit
141 Chip holder
142 Conveyance stage
150 Control section (processing unit)
160 Nozzle
α Excitation light
β Plasmon scattered light
γ Fluorescence

The invention claimed is:

1. A detection method for detecting the presence or amount of a detection target substance in a specimen, the method comprising: supplying a liquid to a detection chip including a housing having an opening portion at a first end of a flowpath and internally housing a liquid and including an elastic sheet covering the opening portion and having a penetrating portion providing communication between the inside and the outside of the housing, specifically by inserting a liquid delivery nozzle to the housing via the penetrating portion and supplying the liquid into the housing in a state where the nozzle is in contact with the elastic sheet so as to close the penetrating portion, wherein the penetrating portion is one of a hole and a notch, the one of a hole and a notch preformed in the elastic sheet prior to inserting the liquid delivery nozzle, and one of a maximum length of the opening of the hole and a maximum length of the notch is smaller than an outer diameter of the nozzle at a portion coming in contact with the elastic sheet when the nozzle is inserted so as to close the penetrating portion when the liquid is supplied into the housing, wherein the elastic sheet is joined to a periphery of the opening portion via an adhesive sheet; and wherein the adhesive sheet includes a through hole preformed in the adhesive sheet at a position corresponding to the penetrating portion, and a minimum length of an opening of the through hole is greater than the outer diameter of the nozzle at a position corresponding to the through hole when the nozzle is inserted to the housing so as to close the penetrating portion when the liquid is supplied into the housing; wherein the housing further includes a stirring through hole disposed at a second end of the flowpath, the stirring through hole having a larger cross-sectional area than the opening portion, the stirring through hole promoting uniformity of a concentration distribution of the liquid and a reaction in the flow path.

2. The detection method according to claim 1, wherein the elastic sheet has a thickness of 10 μm to 500 μm.

3. The detection method according to claim 1, wherein one of the maximum length of the opening of the hole and the maximum length of the notch is ½ or below of the outer diameter of the nozzle at a portion coming in contact with the elastic sheet when the nozzle is inserted to close the penetrating portion when the liquid is supplied into the housing.

4. The detection method according to claim 1, wherein the adhesive sheet is arranged so as to surround the opening portion, and has a width of at least 1 mm in a direction away from the opening portion.

5. The detection method according to claim 1, further comprising a step of reciprocatingly delivering a liquid in the housing by the nozzle.

6. The detection method according to claim 1, further comprising detecting fluorescence emitted at emission of light to the detection chip,
wherein the detection chip further includes a prism formed of a dielectric and a metal film arranged on one surface of the prism and in the housing portion,
the supplying includes supplying the specimen containing a detection target substance into the housing to cause the detection target substance to be directly or indirectly bound onto the metal film, and
the detecting fluorescence includes detecting fluorescence emitted from a fluorescent substance on the metal film when the light is emitted to the metal film from the prism side so as to generate surface plasmon resonance in a state where the detection target substance labeled with the fluorescent substance is directly or indirectly bound onto the metal film.

7. A detection apparatus for detecting the presence or amount of a detection target substance in a specimen, the detection apparatus comprising: a chip holder that holds a detection chip including a housing having an opening portion at a first end of a flow path and internally houses a liquid and including an elastic sheet covering the opening portion and providing communication between the inside and the outside of the housing; and a liquid delivery part including a pump to which a liquid delivery nozzle is attached and delivering a liquid into the housing of the detection chip held by the chip holder, wherein the liquid delivery part inserts the nozzle to the housing via the penetrating portion and supplies a liquid into the housing in a state where the nozzle is in contact with the elastic sheet so as to close the penetrating portion, the penetrating portion is one of a hole and a notch, the one of a hole and a notch preformed in the elastic sheet prior to inserting the liquid delivery nozzle, and one of a maximum length of the opening of the hole and a maximum length of the notch is smaller than an outer diameter of the nozzle at a portion coming in contact with the elastic sheet when the nozzle is inserted so as to close the penetrating portion when the liquid delivery part supplies the liquid into the housing; wherein the elastic sheet is joined to a periphery of the opening portion via an adhesive sheet; and wherein the adhesive sheet includes a through hole preformed in the adhesive sheet at a position corresponding to the penetrating portion, and a minimum length of an opening of the through hole is greater than the outer diameter of the nozzle at a position corresponding to the through hole when the nozzle is inserted to the housing so as to close the penetrating portion when the liquid is supplied into the housing; wherein the housing further includes a stirring through hole disposed at a second end of the flowpath, the stirring through hole having a larger cross-sectional area than the opening portion, the stirring through hole promoting uniformity of a concentration distribution of the liquid and a reaction in the flow path.

8. The detection apparatus according to claim 7, wherein the liquid delivery part reciprocates liquid delivery in the housing by the nozzle.

9. The detection apparatus according to claim 7, further comprising:
a light emission part that emits light to the detection chip held by the chip holder; and
a light detector that detects fluorescence emitted at emission of light to the detection chip,
wherein the detection chip further includes a prism formed of a dielectric and a metal film arranged on one surface of the prism and in the housing portion, and
the light detector detects fluorescence emitted from a fluorescent substance on the metal film when the light emission part emits light to the metal film from the prism side so as to generate surface plasmon resonance on the metal film in a state where the detection target substance labeled with the fluorescent substance is directly or indirectly bound onto the metal film.

10. A test kit comprising: a detection chip including a housing having an opening portion at a first end of a flowpath and internally housing a liquid and including an elastic sheet covering the opening portion and having a penetrating portion providing communication between the inside and the outside of the housing; and a liquid delivery nozzle to be inserted into the housing via the penetrating portion and supplying a liquid to the housing, wherein the penetrating portion is one of a hole or a notch, the one of a hole and a notch preformed in the elastic sheet prior to inserting the liquid delivery nozzle, and one of a maximum length of the opening of the hole and a maximum length of the notch is smaller than an outer diameter of the nozzle at a position from an end of the nozzle in a longitudinal direction of the nozzle, corresponding to a depth from a bottom surface of the housing to the elastic sheet, wherein the elastic sheet is joined to a periphery of the opening portion via an adhesive sheet; and wherein the adhesive sheet includes a through hole preformed in the adhesive sheet at a position corresponding to the penetrating portion, and a minimum length of an opening of the through hole is greater than the outer diameter of the nozzle at a position corresponding to the through hole when the nozzle is inserted to the housing so as to close the penetrating portion when the liquid is supplied into the housing; wherein the housing further includes a stirring through hole disposed at a second end of the flowpath, the stirring through hole having a larger cross-sectional area than the opening portion, the stirring through hole promoting uniformity of a concentration distribution of the liquid and a reaction in the flow path.

11. The detection method according to claim 1, wherein the elastic sheet has a thickness of 10 μm to 500 μm.

12. The detection method according to claim 1, further comprising reciprocatingly delivering a liquid in the housing by the nozzle.

13. The detection method according to claim 1, further comprising detecting fluorescence emitted at emission of light to the detection chip,
wherein the detection chip further includes a prism formed of a dielectric and a metal film arranged on one surface of the prism and in the housing portion,
the supplying includes supplying the specimen containing a detection target substance into the housing to cause the detection target substance to be directly or indirectly bound onto the metal film, and
the detecting fluorescence includes detecting fluorescence emitted from a fluorescent substance on the metal film when the light is emitted to the metal film from the prism side so as to generate surface plasmon resonance in a state where the detection target substance labeled with the fluorescent substance is directly or indirectly bound onto the metal film.

14. The detection method according to claim 1, wherein the elastic sheet has a thickness of 10 μm to 500 μm.

15. The detection method according to claim 1, wherein the adhesive sheet is arranged so as to surround the opening portion, and has a width of at least 1 mm in a direction away from the opening portion.

16. The detection method according to claim 1, further comprising reciprocatingly delivering a liquid in the housing by the nozzle.

17. The detection method according to claim 1, further comprising detecting fluorescence emitted at emission of light to the detection chip,
wherein the detection chip further includes a prism formed of a dielectric and a metal film arranged on one surface of the prism and in the housing portion,
the supplying includes supplying the specimen containing a detection target substance into the housing to cause the detection target substance to be directly or indirectly bound onto the metal film, and
the detecting fluorescence includes detecting fluorescence emitted from a fluorescent substance on the metal film when the light is emitted to the metal film from the prism side so as to generate surface plasmon resonance in a state where the detection target substance labeled with the fluorescent substance is directly or indirectly bound onto the metal film.

18. The detection method according to claim 2, further comprising reciprocatingly delivering a liquid in the housing by the nozzle.

* * * * *